(12) United States Patent
Knott et al.

(10) Patent No.: US 7,936,861 B2
(45) Date of Patent: May 3, 2011

(54) ANNOUNCEMENT SYSTEM AND METHOD OF USE

(75) Inventors: Benjamin Anthony Knott, Round Rock, TX (US); Kurt M. Joseph, Austin, TX (US); Robert R. Bushey, Cedar Park, TX (US); John Mills Martin, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1494 days.

(21) Appl. No.: 10/898,722

(22) Filed: Jul. 23, 2004

(65) Prior Publication Data
US 2006/0018443 A1 Jan. 26, 2006

(51) Int. Cl.
*H04M 1/64* (2006.01)

(52) U.S. Cl. ............ 379/72; 379/88.01; 379/88.17; 379/93.12; 379/917; 455/456.3; 704/3

(58) Field of Classification Search ......... 379/72–76, 379/88.16, 167.08, 263, 67.1, 88.22, 88.01; 705/35; 340/539.1; 716/4; 704/3; 455/456.1–456.3
See application file for complete search history.

(56) References Cited

U.S. PATENT DOCUMENTS

| | | | |
|---|---|---|---|
| 4,696,028 A | 9/1987 | Morganstein et al. | |
| 4,788,715 A | 11/1988 | Lee | |
| 4,953,204 A | 8/1990 | Cuschleg, Jr. et al. | |
| 4,964,077 A | 10/1990 | Eisen et al. | |
| 4,967,405 A | 10/1990 | Upp et al. | |
| 5,042,006 A | 8/1991 | Flohrer | |
| 5,235,679 A | 8/1993 | Yoshizawa et al. | |
| 5,335,269 A | 8/1994 | Steinlicht | |
| 5,416,830 A | 5/1995 | MacMillan, Jr. et al. | |
| 5,455,903 A | 10/1995 | Jolissaint et al. | |
| 5,497,373 A | 3/1996 | Hulen et al. | |
| 5,522,046 A | 5/1996 | McMillen et al. | |
| 5,530,744 A | 6/1996 | Charalambous et al. | |
| 5,555,299 A | 9/1996 | Maloney et al. | |
| 5,590,186 A | 12/1996 | Liao et al. | |
| 5,632,002 A | 5/1997 | Hashimoto et al. | |
| 5,652,789 A | 7/1997 | Miner | |
| 5,675,817 A * | 10/1997 | Moughanni et al. ............ 704/3 |
| 5,729,600 A | 3/1998 | Blaha et al. | |
| 5,754,639 A | 5/1998 | Flockhart et al. | |

(Continued)

FOREIGN PATENT DOCUMENTS

EP 0 424 015 A2 4/1991

(Continued)

OTHER PUBLICATIONS

U.S. Appl. No. 10/975,023, filed Oct. 27, 2004.

(Continued)

*Primary Examiner* — Md S Elahee
(74) *Attorney, Agent, or Firm* — Toler Law Group

(57) ABSTRACT

The disclosure is directed to a system including a factor engine, an audio clip sequencing engine and an announcement engine. The factor engine is configured to identify an ordered set of menu options based on a plurality of weighted factors. The audio clip sequencing engine is responsive to the factor engine and is configured to generate an ordered sequence of audio clips based on the ordered set of menu options. The announcement engine is responsive to the audio clip sequencing engine and is configured to play the ordered sequence of audio clips.

26 Claims, 5 Drawing Sheets

U.S. PATENT DOCUMENTS

| | | | |
|---|---|---|---|
| 5,754,978 A | 5/1998 | Perez-Mendez et al. | |
| 5,923,745 A | 7/1999 | Hurd | |
| 5,940,476 A | 8/1999 | Morganstein | |
| 5,946,377 A | 8/1999 | Wolf | |
| 5,946,388 A | 8/1999 | Walker et al. | |
| 5,953,704 A | 9/1999 | McIlroy et al. | |
| 5,991,756 A | 11/1999 | Wu | |
| 5,995,979 A | 11/1999 | Cochran | |
| 5,999,965 A | 12/1999 | Kelly | |
| 6,002,689 A | 12/1999 | Christie et al. | |
| 6,002,760 A | 12/1999 | Gisby | |
| 6,003,011 A | 12/1999 | Sarin et al. | |
| 6,028,601 A | 2/2000 | Machiraju et al. | |
| 6,038,293 A | 3/2000 | McNerney et al. | |
| 6,038,305 A | 3/2000 | McAllister | |
| 6,044,146 A | 3/2000 | Gisby et al. | |
| 6,049,594 A | 4/2000 | Furman et al. | |
| 6,061,433 A * | 5/2000 | Polcyn et al. | 379/93.12 |
| 6,064,731 A | 5/2000 | Flockhart et al. | |
| 6,118,866 A | 9/2000 | Shtivelman | |
| 6,119,101 A | 9/2000 | Peckover | |
| RE37,001 E | 12/2000 | Morganstein et al. | |
| 6,173,266 B1 | 1/2001 | Marx et al. | |
| 6,173,289 B1 | 1/2001 | Sonderegger et al. | |
| 6,173,399 B1 | 1/2001 | Gilbrech | |
| 6,175,621 B1 | 1/2001 | Begeja | |
| 6,259,786 B1 | 7/2001 | Gisby | |
| 6,269,153 B1 | 7/2001 | Carpenter et al. | |
| 6,317,439 B1 | 11/2001 | Cardona et al. | |
| 6,333,980 B1 | 12/2001 | Hollatz et al. | |
| 6,353,608 B1 | 3/2002 | Cullers et al. | |
| 6,366,658 B1 | 4/2002 | Bjornberg et al. | |
| 6,366,668 B1 | 4/2002 | Borst et al. | |
| 6,377,662 B1 | 4/2002 | Hunt et al. | |
| 6,381,329 B1 | 4/2002 | Uppaluru et al. | |
| 6,385,584 B1 | 5/2002 | McAllister et al. | |
| 6,389,400 B1 | 5/2002 | Bushey et al. | |
| 6,400,804 B1 | 6/2002 | Bilder | |
| 6,400,996 B1 | 6/2002 | Hoffberg et al. | |
| 6,405,159 B2 | 6/2002 | Bushey et al. | |
| 6,411,687 B1 | 6/2002 | Bohaceck et al. | |
| 6,414,966 B1 | 7/2002 | Kulkarni et al. | |
| 6,418,424 B1 | 7/2002 | Hoffberg et al. | |
| 6,421,433 B1 | 7/2002 | Arsenault | |
| 6,434,546 B1 | 8/2002 | Williamowski et al. | |
| 6,438,520 B1 | 8/2002 | Curt | |
| 6,442,247 B1 | 8/2002 | Garcia | |
| 6,509,833 B2 * | 1/2003 | Tate | 340/539.1 |
| 6,510,414 B1 | 1/2003 | Chaves | |
| 6,519,562 B1 | 2/2003 | Phillips et al. | |
| 6,526,126 B1 | 2/2003 | Morganstein | |
| 6,529,871 B1 | 3/2003 | Kanevsky et al. | |
| 6,546,087 B2 | 4/2003 | Shaffer et al. | |
| 6,553,112 B2 | 4/2003 | Dhir et al. | |
| 6,553,113 B1 | 4/2003 | Dhir et al. | |
| 6,570,967 B2 | 5/2003 | Katz | |
| 6,571,240 B1 | 5/2003 | Ho et al. | |
| 6,574,599 B1 | 6/2003 | Lim et al. | |
| 6,584,180 B2 | 6/2003 | Nemoto | |
| 6,584,191 B1 | 6/2003 | McPartlan et al. | |
| 6,587,556 B1 | 7/2003 | Judkins et al. | |
| 6,598,021 B1 | 7/2003 | Shambaugh et al. | |
| 6,598,136 B1 | 7/2003 | Norrod et al. | |
| 6,600,736 B1 | 7/2003 | Ball et al. | |
| 6,603,837 B1 * | 8/2003 | Kesanupalli et al. | 379/88.17 |
| 6,603,854 B1 | 8/2003 | Judkins et al. | |
| 6,614,781 B1 | 9/2003 | Elliott et al. | |
| 6,615,248 B1 | 9/2003 | Smith | |
| 6,615,249 B2 | 9/2003 | Smith | |
| 6,631,186 B1 | 10/2003 | Adams et al. | |
| 6,662,163 B1 | 12/2003 | Albayrak | |
| 6,678,360 B1 | 1/2004 | Katz | |
| 6,678,718 B1 | 1/2004 | Khouri et al. | |
| 6,690,788 B1 | 2/2004 | Bauer et al. | |
| 6,694,012 B1 | 2/2004 | Posthuma | |
| 6,697,460 B2 | 2/2004 | Knott et al. | |
| 6,700,972 B1 | 3/2004 | McHugh et al. | |
| 6,704,404 B1 | 3/2004 | Burnett | |
| 6,707,789 B1 | 3/2004 | Arslan et al. | |
| 6,714,631 B1 | 3/2004 | Martin et al. | |
| 6,714,643 B1 | 3/2004 | Gargeya et al. | |
| 6,721,416 B1 | 4/2004 | Farrell | |
| 6,731,722 B2 | 5/2004 | Coffey | |
| 6,738,082 B1 | 5/2004 | Dong et al. | |
| 6,738,473 B1 | 5/2004 | Burg et al. | |
| 6,744,861 B1 | 6/2004 | Pershan et al. | |
| 6,744,877 B1 | 6/2004 | Edwards | |
| 6,751,306 B2 | 6/2004 | Himmel et al. | |
| 6,757,306 B1 | 6/2004 | Klish, II et al. | |
| 6,766,320 B1 | 7/2004 | Wang et al. | |
| 6,775,359 B1 | 8/2004 | Ron et al. | |
| 6,778,643 B1 | 8/2004 | Bushey et al. | |
| 6,782,412 B2 | 8/2004 | Dinh | |
| 6,792,096 B2 | 9/2004 | Martin et al. | |
| 6,798,876 B1 | 9/2004 | Bala | |
| 6,807,274 B2 | 10/2004 | Joseph et al. | |
| 6,823,307 B1 | 11/2004 | Steinbiss et al. | |
| 6,831,932 B1 | 12/2004 | Boyle et al. | |
| 6,832,224 B2 | 12/2004 | Gilmour | |
| 6,842,504 B2 | 1/2005 | Mills et al. | |
| 6,847,711 B2 | 1/2005 | Knott et al. | |
| 6,853,722 B2 | 2/2005 | Joseph et al. | |
| 6,853,966 B2 | 2/2005 | Bushey et al. | |
| 6,859,529 B2 | 2/2005 | Duncan et al. | |
| 6,871,212 B2 | 3/2005 | Khouri et al. | |
| 6,879,683 B1 | 4/2005 | Fain et al. | |
| 6,885,734 B1 | 4/2005 | Eberle et al. | |
| 6,891,932 B2 | 5/2005 | Bhargava et al. | |
| 6,895,083 B1 | 5/2005 | Bers et al. | |
| 6,901,366 B1 | 5/2005 | Kuhn et al. | |
| 6,907,119 B2 | 6/2005 | Case et al. | |
| 6,915,246 B2 | 7/2005 | Gusler et al. | |
| 6,922,689 B2 | 7/2005 | Shtivelman | |
| 6,925,155 B2 | 8/2005 | Reynolds et al. | |
| 6,944,592 B1 | 9/2005 | Pickering | |
| 6,963,983 B2 | 11/2005 | Munson et al. | |
| 6,964,023 B2 | 11/2005 | Maes | |
| 6,970,554 B1 | 11/2005 | Peterson et al. | |
| 6,999,755 B2 | 2/2006 | Park | |
| 7,003,079 B1 | 2/2006 | McCarthy et al. | |
| 7,006,605 B1 | 2/2006 | Morganstein | |
| 7,013,112 B2 | 3/2006 | Haller et al. | |
| 7,027,975 B1 | 4/2006 | Pazandak et al. | |
| 7,031,444 B2 | 4/2006 | Shen et al. | |
| 7,035,388 B2 | 4/2006 | Kurosaki | |
| 7,039,166 B1 | 5/2006 | Peterson et al. | |
| 7,062,505 B2 | 6/2006 | Lane et al. | |
| 7,065,201 B2 | 6/2006 | Bushey et al. | |
| 7,072,457 B2 | 7/2006 | Brown et al. | |
| 7,092,370 B2 | 8/2006 | Jiang et al. | |
| 7,095,827 B2 | 8/2006 | Guedalia | |
| 7,095,842 B2 | 8/2006 | Brown et al. | |
| 7,106,850 B2 | 9/2006 | Campbell et al. | |
| 7,130,411 B2 | 10/2006 | Brown et al. | |
| 7,142,652 B2 | 11/2006 | Ho | |
| 7,184,534 B2 | 2/2007 | Birch et al. | |
| 7,200,614 B2 | 4/2007 | Reid et al. | |
| 7,245,711 B2 | 7/2007 | Margolis | |
| 7,349,843 B1 | 3/2008 | Beck | |
| 7,353,033 B2 * | 4/2008 | Kwon | 455/456.3 |
| 7,447,299 B1 * | 11/2008 | Partovi et al. | 379/88.01 |
| 2001/0011211 A1 | 8/2001 | Bushey et al. | |
| 2001/0018672 A1 | 8/2001 | Petters et al. | |
| 2001/0021948 A1 | 9/2001 | Khouri et al. | |
| 2001/0032211 A1 | 10/2001 | Kuzumaki | |
| 2001/0032229 A1 | 10/2001 | Hulls et al. | |
| 2001/0034662 A1 | 10/2001 | Morris | |
| 2002/0023251 A1 * | 2/2002 | Nasr et al. | 716/4 |
| 2002/0046030 A1 | 4/2002 | Harista | |
| 2002/0049874 A1 | 4/2002 | Kimura | |
| 2002/0057678 A1 | 5/2002 | Jiang et al. | |
| 2002/0059164 A1 | 5/2002 | Shtivelman | |
| 2002/0059169 A1 | 5/2002 | Quaterman et al. | |
| 2002/0067714 A1 | 6/2002 | Crain et al. | |
| 2002/0067820 A1 * | 6/2002 | Benson et al. | |
| 2002/0087385 A1 | 7/2002 | Vincent | |
| 2002/0114432 A1 | 8/2002 | Shaffer et al. | |

| | | |
|---|---|---|
| 2002/0133394 A1 | 9/2002 | Bushey et al. |
| 2002/0133413 A1 | 9/2002 | Chang et al. |
| 2002/0135618 A1 | 9/2002 | Maes |
| 2002/0156699 A1 | 10/2002 | Gray et al. |
| 2002/0165732 A1 | 11/2002 | Ezzeddine et al. |
| 2002/0188438 A1 | 12/2002 | Knight et al. |
| 2002/0196277 A1 | 12/2002 | Bushey et al. |
| 2003/0018659 A1 | 1/2003 | Fuks et al. |
| 2003/0026409 A1 | 2/2003 | Bushey et al. |
| 2003/0035381 A1 | 2/2003 | Chen et al. |
| 2003/0035516 A1 | 2/2003 | Guedalia |
| 2003/0069937 A1 | 4/2003 | Khouri et al. |
| 2003/0097428 A1 | 5/2003 | Afkhami et al. |
| 2003/0103619 A1 | 6/2003 | Brown et al. |
| 2003/0112956 A1 | 6/2003 | Brown et al. |
| 2003/0114105 A1 | 6/2003 | Haller et al. |
| 2003/0125945 A1 | 7/2003 | Doyle |
| 2003/0130864 A1 | 7/2003 | Ho et al. |
| 2003/0143981 A1 | 7/2003 | Kortum et al. |
| 2003/0144846 A1 | 7/2003 | Denenberg et al. |
| 2003/0144919 A1 | 7/2003 | Trompette et al. |
| 2003/0156133 A1 | 8/2003 | Martin et al. |
| 2003/0165223 A1 | 9/2003 | Timmins et al. |
| 2003/0187732 A1 | 10/2003 | Seta |
| 2003/0187773 A1 | 10/2003 | Santos et al. |
| 2003/0194063 A1 | 10/2003 | Martin et al. |
| 2003/0195753 A1 | 10/2003 | Homuth |
| 2003/0202640 A1 | 10/2003 | Knott et al. |
| 2003/0202643 A1 | 10/2003 | Joseph et al. |
| 2003/0202649 A1 | 10/2003 | Haug, Jr. et al. |
| 2003/0204435 A1 | 10/2003 | McQuilkin et al. |
| 2003/0228007 A1 | 12/2003 | Kurosaki |
| 2003/0235282 A1 | 12/2003 | Sichelman |
| 2003/0235287 A1 | 12/2003 | Margolis |
| 2004/0005047 A1 | 1/2004 | Joseph et al. |
| 2004/0006473 A1 | 1/2004 | Mills et al. |
| 2004/0032862 A1 | 2/2004 | Schoeneberger et al. |
| 2004/0032935 A1 | 2/2004 | Mills et al. |
| 2004/0042592 A1 | 3/2004 | Knott et al. |
| 2004/0044950 A1 | 3/2004 | Mills et al. |
| 2004/0066401 A1 | 4/2004 | Bushey et al. |
| 2004/0066416 A1 | 4/2004 | Knott et al. |
| 2004/0073569 A1 | 4/2004 | Knott et al. |
| 2004/0083479 A1 | 4/2004 | Bondarenko et al. |
| 2004/0088285 A1 | 5/2004 | Martin et al. |
| 2004/0103017 A1 | 5/2004 | Reed et al. |
| 2004/0109555 A1 | 6/2004 | Williams |
| 2004/0120473 A1 | 6/2004 | Birch et al. |
| 2004/0125937 A1 | 7/2004 | Turcan et al. |
| 2004/0125938 A1 | 7/2004 | Turcan et al. |
| 2004/0125940 A1 | 7/2004 | Turcan et al. |
| 2004/0161078 A1 | 8/2004 | Knott et al. |
| 2004/0161094 A1 | 8/2004 | Martin et al. |
| 2004/0161096 A1 | 8/2004 | Knott et al. |
| 2004/0174980 A1 | 9/2004 | Knott et al. |
| 2004/0230438 A1 | 11/2004 | Pasquale et al. |
| 2004/0240635 A1 | 12/2004 | Bushey et al. |
| 2004/0243568 A1 | 12/2004 | Wang et al. |
| 2005/0008141 A1 | 1/2005 | Kortum et al. |
| 2005/0015197 A1 | 1/2005 | Ohtsuji et al. |
| 2005/0015744 A1 | 1/2005 | Bushey et al. |
| 2005/0018825 A1 | 1/2005 | Ho |
| 2005/0027535 A1 | 2/2005 | Martin et al. |
| 2005/0041796 A1 | 2/2005 | Joseph et al. |
| 2005/0047578 A1 | 3/2005 | Knott et al. |
| 2005/0055216 A1 | 3/2005 | Bushey et al. |
| 2005/0058264 A1 | 3/2005 | Joseph et al. |
| 2005/0075894 A1 | 4/2005 | Bushey et al. |
| 2005/0078805 A1 | 4/2005 | Mills et al. |
| 2005/0080630 A1 | 4/2005 | Mills et al. |
| 2005/0080667 A1 | 4/2005 | Knott et al. |
| 2005/0125232 A1 | 6/2005 | Gadd |
| 2005/0131892 A1 | 6/2005 | Knott et al. |
| 2005/0132262 A1 | 6/2005 | Bushey et al. |
| 2005/0135595 A1 | 6/2005 | Bushey et al. |
| 2005/0141692 A1 | 6/2005 | Scherer et al. |
| 2005/0147218 A1 | 7/2005 | Novack et al. |
| 2005/0169441 A1 | 8/2005 | Yacoub |
| 2005/0169453 A1 | 8/2005 | Knott et al. |
| 2005/0171877 A1* | 8/2005 | Weiss .............................. 705/35 |
| 2005/0201547 A1 | 9/2005 | Burg et al. |
| 2005/0240411 A1 | 10/2005 | Yacoub |
| 2006/0018443 A1 | 1/2006 | Knott et al. |
| 2006/0023863 A1* | 2/2006 | Joseph et al. |
| 2006/0026049 A1* | 2/2006 | Joseph et al. |
| 2006/0036437 A1* | 2/2006 | Bushey et al. |
| 2006/0039547 A1* | 2/2006 | Klein et al. |
| 2006/0056406 A1* | 3/2006 | Bouchard et al. |
| 2006/0072737 A1* | 4/2006 | Paden et al. |
| 2006/0165066 A1* | 7/2006 | Campbell et al. |
| 2006/0177040 A1* | 8/2006 | Mitra |
| 2006/0195312 A1* | 8/2006 | Knight et al. |
| 2006/0291642 A1* | 12/2006 | Bushey et al. |
| 2007/0041551 A1* | 2/2007 | Whitecotton et al. |
| 2007/0047720 A1* | 3/2007 | Brandt et al. |
| 2007/0116230 A1* | 5/2007 | Brandt et al. |

FOREIGN PATENT DOCUMENTS

| | | |
|---|---|---|
| EP | 0 424 015 A3 | 4/1991 |
| EP | 0 424 015 B1 | 4/1991 |
| EP | 0 876 652 A4 | 9/1996 |
| WO | WO 97/26612 | 7/1997 |
| WO | WO 01/37539 A2 | 5/2001 |
| WO | WO 01/37539 A3 | 5/2001 |
| WO | WO 2004/017584 | 2/2004 |
| WO | WO 2004/049222 A2 | 6/2004 |

OTHER PUBLICATIONS

U.S. Appl. No. 10/901,926, filed Jul. 28, 2004.
U.S. Appl. No. 10/901,925, filed Jul. 28, 2004.
U.S. Appl. No. 10/917,233, filed Aug. 12, 2004.
U.S. Appl. No. 10/935,726, filed Sep. 7, 2004.
U.S. Appl. No. 10/999,199, filed Nov. 29, 2004.
U.S. Appl. No. 11/005,498, filed Dec. 6, 2004.
U.S. Appl. No. 11/005,494, filed Dec. 6, 2004.
U.S. Appl. No. 11/010,633, filed Dec. 13, 2004.
U.S. Appl. No. 11/032,495, filed Jan. 10, 2005.
U.S. Appl. No. 11/036,204, filed Jan. 14, 2005.
U.S. Appl. No. 11/036,201, filed Jan. 14, 2005.
U.S. Appl. No. 11/062,100, filed Feb. 18, 2005.
U.S. Appl. No. 11/071,068, filed Mar. 3, 2005.
U.S. Appl. No. 11/086,796, filed Mar. 23, 2005.
U.S. Appl. No. 11/129,051, filed May 13, 2005.
U.S. Appl. No. 11/145,513, filed Jun. 3, 2005.
U.S. Appl. No. 11/173,227, filed Jul. 1, 2005.
U.S. Appl. No. 11/176,972, filed Jul. 7, 2005.
U.S. Appl. No. 11/086,794, filed Mar. 22, 2005.
U.S. Appl. No. 10/996,127, filed Nov. 23, 2004.
U.S. Appl. No. 10/920,719, filed Dec. 13, 2004.
U.S. Appl. No. 10/920,720, filed Aug. 18, 2004.
U.S. Appl. No. 10/948,089, filed Sep. 23, 2004.
U.S. Appl. No. 10/979,784, filed Nov. 2, 2004.
U.S. Appl. No. 11/212,939, filed Aug. 25, 2005.
Yahoo internet archive of Dec. 12, 1998, retrieved at <<http://web.archive.org/web/19981212034238/http://www.yahoo.com>>.*
Ogino, Tsukasa, et al., "Technologies for Internet Infrastructure: Eliminating the World Wide Wait," iNet Japan, Jul. 18-21, 2000, www.isoc.org/inet2000/cdproceedings/1g/index.*

* cited by examiner

| FACTOR | WEIGHT | SCORE |
|---|---|---|
| 1 | 10% | OPTIONS CLIP #1 |
| 2 | 40% | OPTIONS CLIP #2 |
| 3 | 30% | OPTIONS CLIP #3 |
| 4 | 20% | OPTIONS CLIP #2 |
| 5 | * | PREEMPTIVE CLIP | ents and methods of interacting with callers.

ANNOUNCEMENT SYSTEM AND METHOD OF USE

FIELD OF THE DISCLOSURE

This disclosure, in general, relates to announcement systems and methods of interacting with callers.

BACKGROUND

Increasingly, business transactions are handled via telephone including customer complaint and customer support handling. Businesses have established call centers to handle incoming call traffic and to interact with customers. However, these call centers, staffed by live people, tend to be expensive and difficult to staff.

Paying for call centers is an expensive proposition relative to automated methods, such as websites for Internet traffic. In addition, businesses have found that it is difficult to effectively train and maintain staffing at call centers. It is expensive to train personnel for call centers and at the same time it is difficult to retain trained call center agents. High turnover rates coupled with expensive training leads to a high cost for call centers.

To counteract this cost, businesses have turned to interactive voice response systems to provide automated answers to customer questions and to selectively route calls based on a call subject to a set of agents trained on a narrower set of subjects. Such systems have been found to reduce call center volume and to reduce training expenses associated with training call center agents.

However, customers complain of lengthy menus and difficulty in navigating such menus. Often, a customer calling a call center must wait through a lengthy menu or a series of menus in order to determine which option best suits his or her needs. After waiting through several menus and submenus, customers sometimes become frustrated, leading to poor customer satisfaction and potentially lost sales. As such, there is a need for an improved announcement system and method of interacting with callers.

DETAILED DESCRIPTION OF THE DRAWINGS

Figure 1:
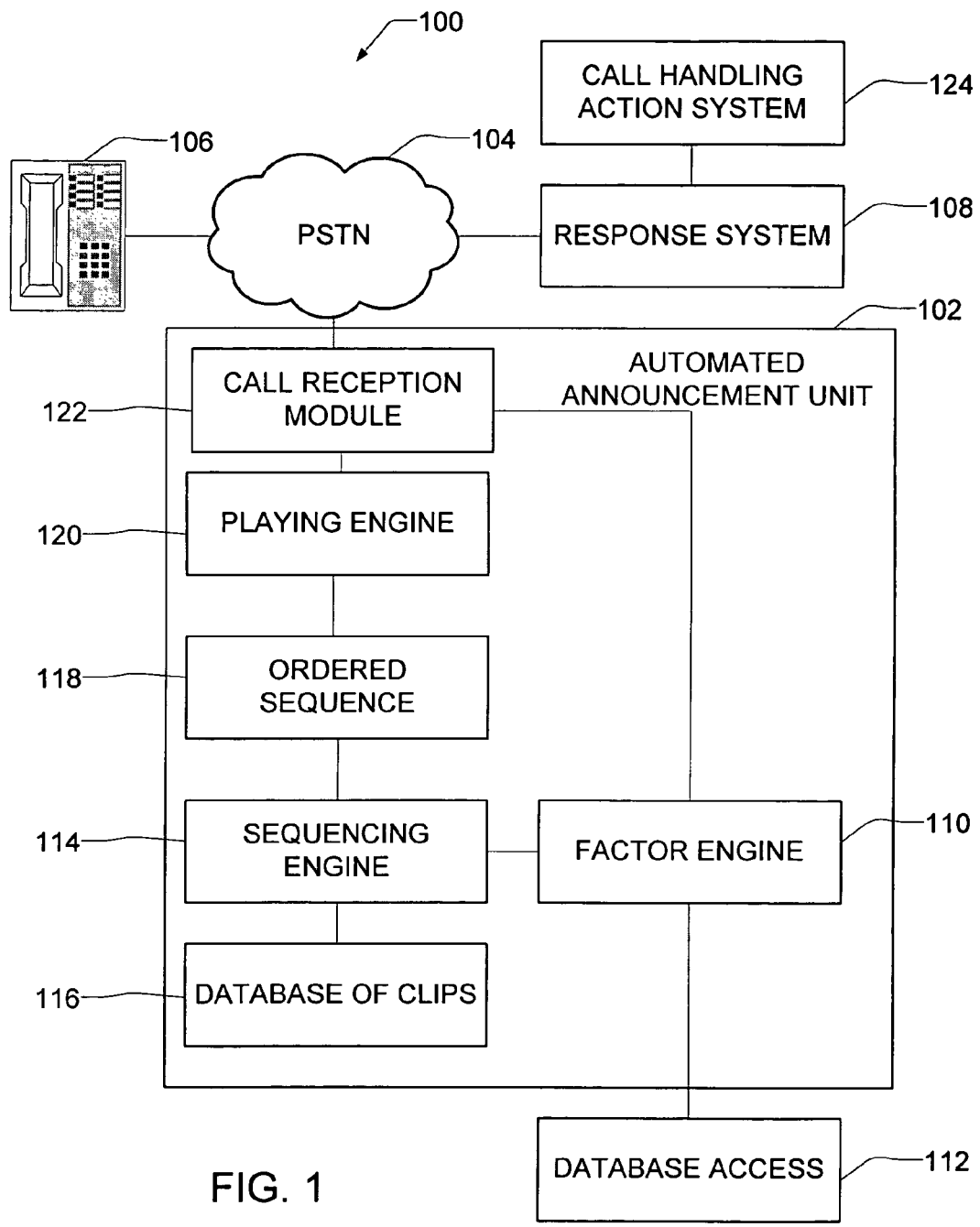
FIG. 1 is a general diagram illustrating an exemplary system to provide automated announcements.

In a particular embodiment, the disclosure is directed to an announcement system. The announcement system may receive a call and, using a factor engine, determine an ordered set of menu options. A sequencing engine is configured to generate an ordered sequence of audio clips based on the ordered set of menu options. The system further includes a playing engine configured to generate an announcement based on the ordered sequence of audio clips. In a particular exemplary embodiment, the announcement system is integrated with an interactive voice response system (IVR). The factor engine may access a set of databases to determine the set of menu options and, based on a weighted table, may determine the order of the ordered set of menu options.

In one exemplary embodiment, the disclosure is directed to a system including a factor engine, an audio clip sequencing engine, and an announcement engine. The factor engine is configured to identify an ordered set of menu options based on a plurality of weighted factors. The audio clip sequencing engine is responsive to the factor engine and is configured to generate an ordered sequence of audio clips based on the ordered set of menu options. The announcement engine is responsive to the audio clip sequencing engine and is configured to play the ordered sequence of audio clips in the order of the ordered sequence.

In another exemplary embodiment, the disclosure is directed to a method of interacting with a caller. The method includes receiving a call at an automated announcement unit, determining an order of a set of menu options to generate an ordered set of menu options based on a plurality of weighted factors and generating an announcement with respect to the call at the automated announcement unit by playing an ordered sequence of audio clips, wherein the ordered sequence is based on the ordered set of menu options.

In a further exemplary embodiment, the disclosure is directed to an announcement system including a memory and an announcement engine. The memory includes an ordered sequence of audio clips. The ordered sequence of audio clips includes a first general clip and an ordered set of menu clips wherein the order of the ordered set of menu clips is based on a plurality of weighted factors. The announcement engine is configured to play an audio announcement derived from the ordered sequence of audio clips.

In another exemplary embodiment, the disclosure is directed to a system for providing information to a caller over a telephone. The system includes an interactive voice response unit and an audio menu module. The interactive voice response unit is operable to provide voice prompts to a caller and to accept caller input selected from the group consisting of voice utterances and tones. The audio menu module is responsive to the interactive voice response unit. The audio menu module defines an ordered set of audio prompts for playback to the caller, wherein an order of the ordered set of audio prompts is based on a plurality of different weighted factors associated with a plurality of selectable user options.

In a further exemplary embodiment, the disclosure is directed to an announcement system having a computer readable memory. The computer readable memory includes an audio menu. The audio menu includes an opening statement voice prompt that requests a caller statement identifying a caller information. The audio menu also includes a plurality of menu option voice prompts. Each of the plurality of menu option voice prompts requests a caller statement or a numeric selection to indicate a caller request to receive information associated with the respective menu option voice prompt. The plurality of menu option voice prompts are ordered in a playback sequence based on a plurality of weighted factors.

In another exemplary embodiment, the disclosure is directed to an interactive call handling system including a call reception module, a factor engine, an audio clip sequencing engine, an announcement engine, a response system, and a call handling action system. The call reception module is configured to receive an incoming call. The factor engine is responsive to the call reception module and is configured to identify an ordered set of menu options based on a plurality of weighted factors. The audio clip sequencing engine is responsive to the factor engine and is configured to generate an ordered sequence of audio clips corresponding to the ordered set of menu options. The announcement engine is responsive to the audio clip sequencing engine and is responsive to the call reception module. The announcement engine is configured to play the ordered sequence of audio clips in the order of the ordered sequence in response to the incoming call. The response system is responsive to the call reception module and is configured to receive a caller selection from the incoming call. The caller selection is selected from one of the ordered set of menu options. The call handling action system is responsive to the response system and is configured to perform a call handling action on behalf of the incoming call in response to the caller selection.

An exemplary system is depicted in FIG. 1. An automated announcement unit 102 is connected to a Public Switched Telephone Network (PSTN) 104. A caller using a telephone 106 connected to the PSTN 104 may initiate a call and be directed to the automated announcement unit 102. The automated announcement unit 102 may play an ordered sequence of audio clips to produce an announcement and menu from which the caller may select options. The caller in one exemplary embodiment makes a voice statement or enters a Dual Tone Multi Frequency (DTMF) selection that is received by the response system 108. The response system 108 acts on the selection and initiates a call-handling action via the call handling action system 124. The call-handling action may, for example, lead to a subsequent menu, route the call to an agent, change a component of a caller service, or provide requested information.

The automated announcement unit 102 includes a call reception module 122, a factor engine 110, a sequencing engine 114, and a playing engine 120. The call reception module 122 is configured to receive a call. Data associated with the call may be routed to the factor engine 110. The factor engine 110 may access databases 112 and determine a set of menu options based on the information received in association with the call and based on information accessed via the databases 112. For example, the factor engine 110 may receive information associated with a call initiated by phone 106, such as a number dialed or a number associated with the phone 106. Using this information, the factor engine 110 may access databases 112 such as a billing history database, an order history database, an account information database, a product information database, and a service order database. Based on a set of factors, a set of menu options may be identified or selected, and, using a factor weighting table, these menu options may be ordered and provided to the sequencing engine 114. In one exemplary embodiment, each factor is used individually to determine or select a menu option and the selected menu options may be ordered based on weightings assigned to the factors associated with the menu options.

The sequencing engine 114 utilizes the ordered set of menu options to select audio clips from an audio clip database 116. The sequencing engine 114 orders the audio clips based on the ordered set of menu options to produce an ordered sequence of audio clips 118. The playing engine 120 accesses the ordered sequence of audio clips 118 to generate an announcement that is provided to the caller 106 via the call reception module 122 and the PSTN 104. In one exemplary embodiment, the caller at the phone 106 may provide a response, such as by speaking or by selecting a DTMF signal using a telephone keypad. The response system 108 interprets the selection, such as through voice recognition or DTMF recognition, and initiates a call-handling action in the call handling action system 124. In one exemplary embodiment, the response system 108 is coupled to the PSTN. Alternatively, the response system 108 may be coupled to the call reception module 122.

The automated announcement unit 102 may be implemented with a set of one or more processors or computational devices and software operable by the computational devices to implement the factor engine 110, the sequencing engine 114, the playing engine 120, and the call reception module 122. Data files such as menu options, a database of audio clips 116, and an ordered sequence of audio clips 118 may be stored in and accessed through computer-readable memory. Computer-readable memory may include RAM, ROM, hard drives, floppy drives, magnetic drives, optical drives, flash memory, and removable drives.

In one exemplary embodiment, the automated announcement unit 102 and the response system 108 may be a component integrated into an IVR system. In another exemplary embodiment, the automated announcement unit 102 may be incorporated into a node of an advanced intelligent network (AIN).

Figure 2:
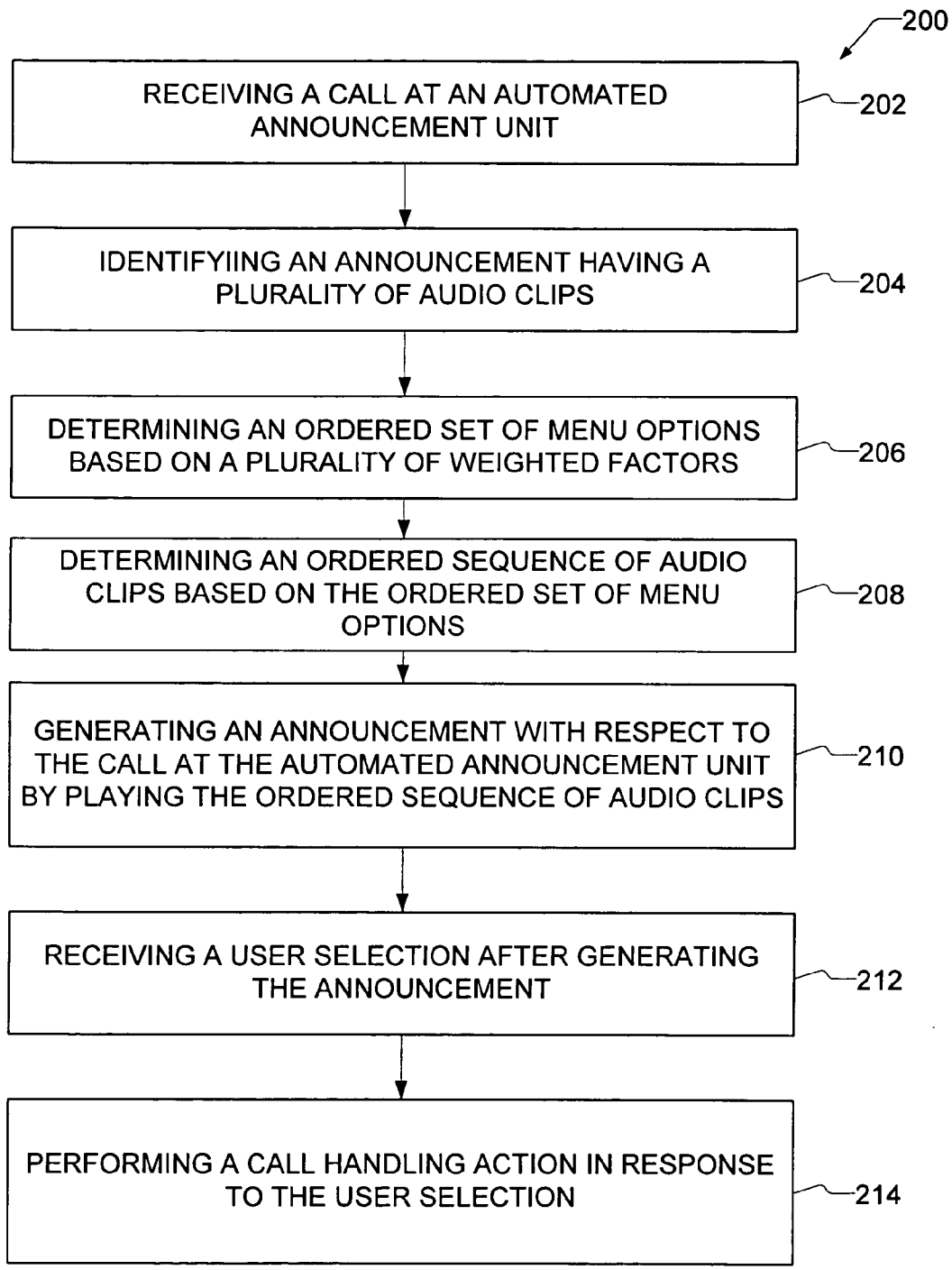
FIG. 2 is a flow diagram depicting an exemplary method of operation of the system of FIG. 1.

FIG. 2 depicts an exemplary method 200 for interacting with a call. The method 200 includes receiving a call at an automated announcement unit, as shown at step 202. An announcement having a plurality of audio clips is identified, as shown at step 204. For example, the announcement may be an opening announcement and a menu, a submenu, or an emergency announcement. An ordered set of menu options may be determined based on a plurality of weighted factors, as shown at step 206. The automated announcement unit determines an ordered sequence of audio clips corresponding to the ordered set of menu options, as shown at step 208. The announcement unit generates an announcement with respect to the call at the automated announcement unit by playing the ordered sequence of audio clips, as shown at step 210. The system may receive a user selection after generating the announcement, as shown at step 212. Alternately, the user may provide a response concurrently with the playing of the announcement, such as when the user hears a desired menu option. In one example, the user may provide a voice response or may provide a DTMF selection to a response unit. In response to the user selection, the system performs a call-handling action, as shown at step 214. The call-handling action may, for example, include routing of the call to an agent, accessing a submenu, or providing requested information.

In a particular exemplary embodiment, the ordered set of menu options is determined based on a plurality of factors. Each factor is associated with an option based on rules and logic associated with the factor. Using a factor weighting table, the options are ordered. Exemplary factors include option selection frequency, geographic region, caller characteristics, different frequency time intervals, marketing priorities, and exception conditions.

For example, frequency with which a menu item is selected by callers may be used to adapt menus dynamically or to select specific menu options. Regional data, such as the destination of a call or the origin of a call, may be used in determining or selecting a menu option. For example, regional data may determine what services and products are available to a customer. In addition, caller characteristics may be used in the selection of a menu option. For example, an automatic number identification (ANI) system may identify a caller, allowing a system to look up information in a customer database. The information may, for example, include billing history, personal history, features associated with the number, past orders, and caller market segment. For example, if an individual recently purchased CallNotes®, then a menu item associated with the caller characteristic might include CallNotes® as an option, such as help information describing use of CallNotes®.

Menu option frequencies may be calculated over different time periods. Differing time intervals over which frequencies are determined may be used as factors in determining a set of menu options. For example, a recent marketing campaign may have increased the frequency of calls associated with a particular product over a short-time period (i.e. 6 months), while longer term frequency calculations indicate that other options are more likely to be requested. In this manner, both the menu option having an associated recent high call frequency and the menu options having longer-term sustained interest may be included in the set of menu options.

Further, marketing campaigns and priorities may be used in the selection of a menu option. Marketing campaigns may emphasize a special promotion for a product and thereby generate calls relating to that product. Relying on historical call frequency alone would delay the emphasis of a menu option while pre-specifying the menu option for the promoted product would present a selection option targeted to early responders to the marketing efforts. In addition, exception conditions, such as pre-emptive events, (e.g. outages and natural events) may be used in determining menu options. For example an announcement may be preempted with a statement acknowledging the outage of a DSL network, assuring customers that the problem has been recognized and is being rectified. In this manner, each factor may be used to select a menu option. The selected menu options are ordered based on weightings associated with each factor.

Figures 3, 4:
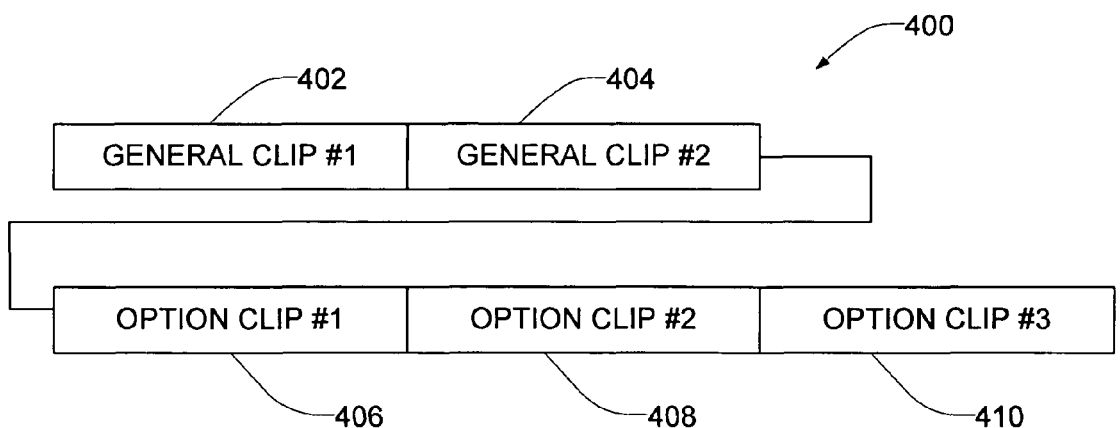
FIG. 3 is a table depicting exemplary weighting factors that may be used by the system of FIG. 1.
FIGS. 4, 5, 6, 7 and 8 are block diagrams illustrating exemplary announcement messages that may be played by an announcement unit.

FIG. 3 depicts an exemplary weighting table. The factors, such as factors 1 through 5, may be used in determining a set of menu options, as depicted in the score column. In this example, factor 1 results in the selection of option clip 1, factor 2 results in the selection of option clip 2, factor 3 results in the selection of option clip 3, factor 4 results in the selection of option clip 2, and factor 5 results in the pre-emptive clip selection. Each factor has an associated weighting, as shown in the weight column. In this example, the weights may be used in ordering the selected menu options. For example, the total weighting associated with option clip 2 equals 60%. Logic associated with both factor 2 and factor 4 resulted in the selection of option clip 2 and the sum of the weights associated with factors 2 and 4 result in a weighting of 60% associated with options clip 2. Option clip 3 receives a weighting of 30% and option clip 1 receives a weighting of 10%. In this exemplary embodiment, the pre-emptive clip is provided with a zero weighting. However, in the event that a pre-emptive event occurs, the weighting of the pre-emptive clip may be switched to 100%. As a result of the exemplary weightings, the order of the example menu options would be option clip 2, followed by option clip 3 and then option clip 1.

FIG. 4 depicts an exemplary ordering or sequencing of a set of audio clips. This ordered set of audio clips may be stored in memory and played to produce an announcement or message 400. In this exemplary embodiment, a set of general clips 1 and 2 (402 and 404) are ordered prior to a set of menu option clips (406, 408, and 410). In this particular embodiment, the general clips 402 and 404 may be a fixed set of audio clips and the option clips may be an adaptive set of audio clips that are rearranged based on the weighted factors. For example, the system may play a message such as:

"Welcome to SBC®'s phone service guide. Please tell me which phone service you would like information about. I have information about CallNotes®, call forwarding, and call blocking."

In this example, general clip 1 (402) may include "Welcome to SBC®'s phone service guide. Please tell me which phone service you would like information about." General clip 2 (404) may include "I have information about". The option clips (406, 408 and 410) may include an ordered sequencing of options. For example, option clip 1 (406) may include "CallNotes®". Option clip 2 (408) may include "call forwarding" and option clip 3 (410) may include "call blocking". While playing the announcement, the user may speak to make a voice selection or depress a touchtone number on a telephone keypad to provide a caller selection that is interpreted by a response system resulting in a call-handling action.

Figure 5:
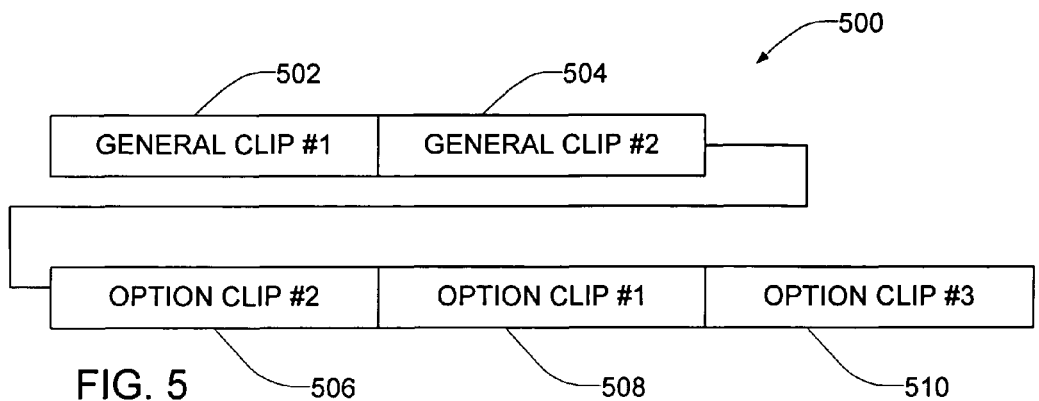
Figure 6:
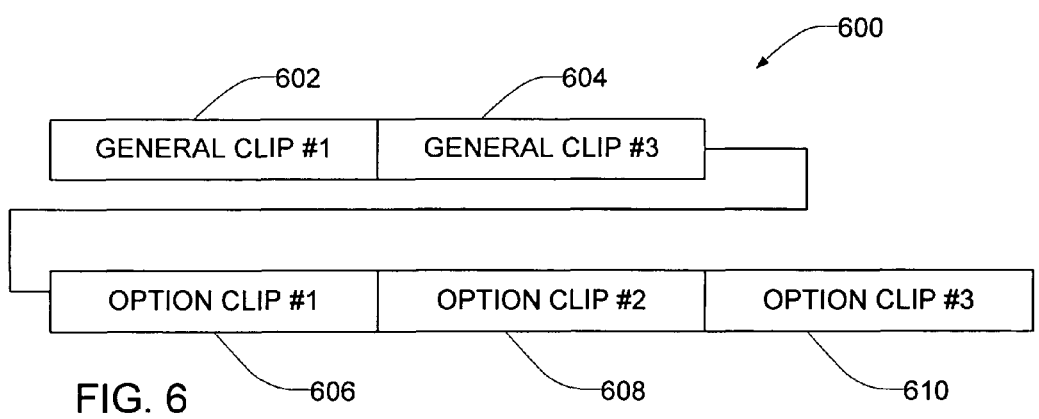

When another call is received the audio menu options may be ordered, as depicted in FIG. 5. The announcement of FIG. 5 includes the general clips 502 and 504, followed by a different ordering of option clips, such as option clip 2 (506), followed by option clip 1 (508) and option clip 3 (510).

While the examples depicted in FIG. 4 and FIG. 5 include a fixed set of general clips, the set of general clips may be adapted based on a set of factors as well. For example, a general clip 1 (602) may be followed by a general clip 3 (604) instead of a general clip 2. In addition, the option clips may be ordered in association with the factors to provide an order of option clips 606, 608 and 610. For example, such ordering may be used to accommodate regional variations in language preferences.

Figure 7:
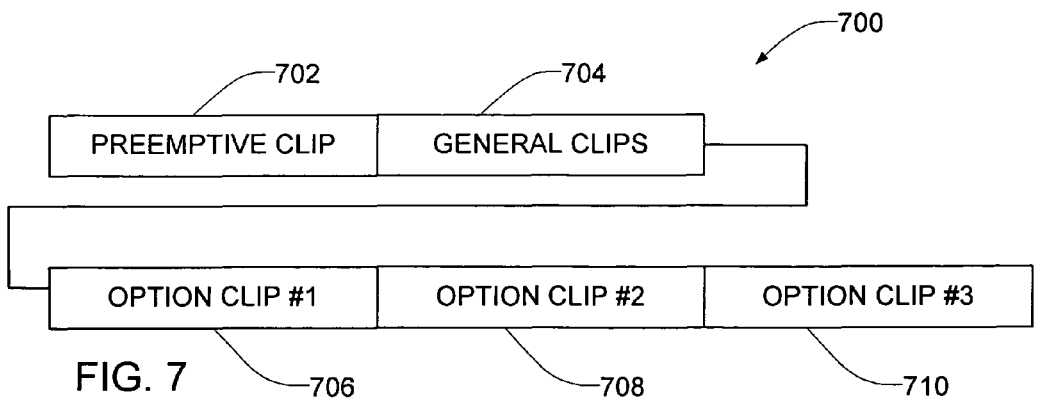

In another exemplary embodiment, the pre-emptive clip 702 may be provided on its own, prior to general clips or as a substitute for the option clips. FIG. 7 depicts an exemplary message 700 that includes a pre-emptive clip 702 prior to general clip 704 and the ordered set of option clips 706, 708, and 710. For example, if a service outage of a specific product were to occur, a call center might receive an increased volume of calls associated with that service outage. A pre-emptive clip may be utilized to provide the caller with information about the service outage, to provide an option prior to the general menu for the caller to select, or assure or assuage the caller that the outage is being remedied.

Figure 8:
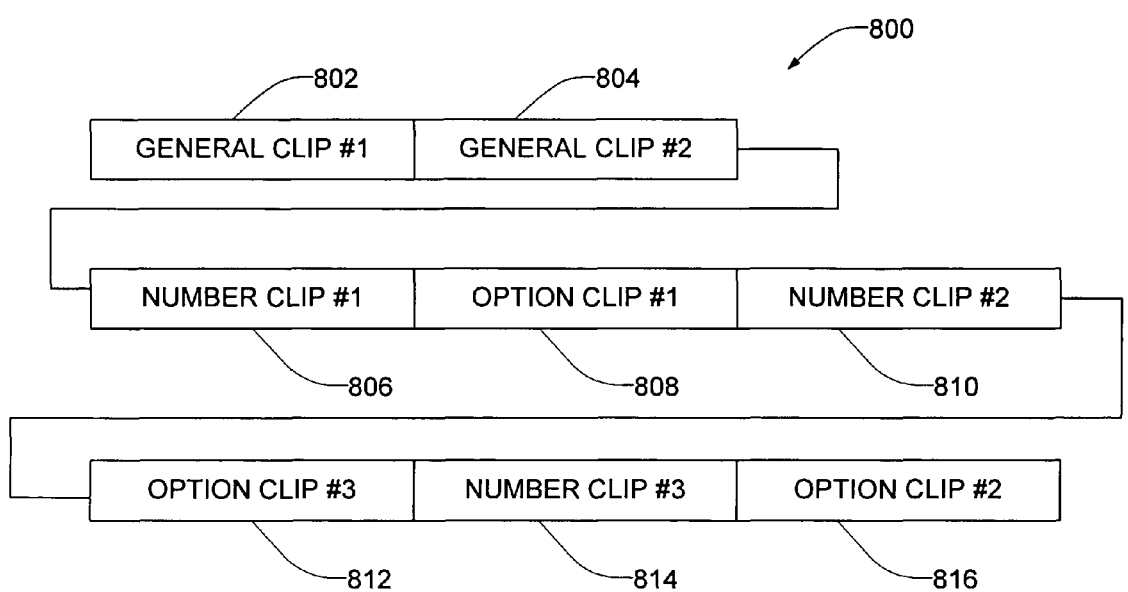

The messages depicted in FIGS. 4 thought 7 depict data that may be used by an interactive voice response system in playing announcements to illicit menu selections from a caller. In an alternate embodiment, a system may be set up to encourage DTMF selection. In this exemplary embodiment, clips that are associated with the ordering of the options such as clips that state Number One, Number Two and Number Three, etc., may be provided. FIG. 8 depicts an exemplary ordering. For example, the announcement 800 may include general clips #1 and #2 (802 and 804) followed by a pairing of number clips and option clips. In this example, number clip #1 may announce "#1" or "option 1" followed by option clip #1. Similarly, number clip #2 may announce "#2" followed by the next option clip in the ordered sequence, such as option clip #3. In a further example, number clip #3 is followed by option clip #2. When the option clips are reordered in accordance with data associated with a subsequent call, the number clips remain in their relative sequence and the option clips associated with the number clips are reordered. In general, the number clips are sequenced into the announcement prior to an associated option clip from the ordered sequence of option clips. For example, a clip intonating "one" may be sequenced in advance of the first ordered or selected option clip followed by an audio clip intonating "two", which is sequenced in advance of a second ordered or selected option clip. In this manner, the system may be set up to allow for either one or both of voice response or DTMF response systems.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
   a call reception module configured to receive a call from a caller;
   a factor engine configured to identify a set of menu options based on a plurality of factors, wherein the factor engine is further configured to order the set of menu options based on weightings associated with each factor of the plurality of factors, wherein the weightings are not defined by the caller, and wherein at least one of the plurality of factors includes a geographic region of the caller, each of the weightings is applied to each of the plurality of factors to produce each weighted factor;
   an audio clip sequencing engine responsive to the factor engine and configured to generate an ordered sequence of audio clips based on the ordered set of menu options, wherein one or more audio clips of the ordered sequence of audio clips are associated with one or more products or services that are available to the caller based on the geographic region of the caller;
   an announcement engine responsive to the audio clip sequencing engine and configured to play the ordered sequence of audio clips in connection with the call; and
   a response system configured to receive a caller selection of a menu option of the set of menu options; wherein the announcement engine configured to play a pre-emptive clip before playing the ordered sequence of audio clips when an exception condition exists.

2. The system of claim 1, further comprising a call handling action system configured to perform a call handling action based on the caller selection.

3. The system of claim 1, wherein the plurality of factors further include a frequency of option selection, a caller characteristic, a time based change in frequency, a marketing priority, and an exception condition.

4. The system of claim 1, wherein the factor engine identifies the set of menu options based on information received in association with the call and based on information from one or more databases.

5. The system of claim 4, wherein the information received in association with the call includes at least one of an originating telephone number of the caller and a destination telephone number.

6. The system of claim 4, wherein the factor engine accesses the one or more databases and retrieves the set of menu options based on the information received in association with the call.

7. The system of claim 4, wherein the one or more databases include one or more of a billing history database, an order history database, an account information database, a product information database, and a service order database.

8. The system of claim 1, wherein the factor engine identifies a first menu option based on a first factor and determines a first score associated with the first menu option based on a first weighting associated with the first factor, wherein the factor engine identifies a second menu option based on a second factor and determines a second score associated with the second menu option based on a second weighting associated with the second factor, and wherein the first menu option precedes the second menu option in the ordered set of menu options when the first score exceeds the second score.

9. The system of claim 1, wherein the factor engine identifies a first menu option based on a first factor and determines a first score associated with the first menu option based on a first weighting associated with the first factor, wherein the factor engine identifies the first menu option based on a second factor and determines a second score associated with the first menu option based on a second weighting associated with the second factor.

10. The system of claim 9, wherein the first menu option precedes a second menu option in the ordered set of menu options when a score associated with the first menu option exceeds another score associated with the second menu option.

11. A method of interacting with a caller, the method comprising:
   receiving a call from a caller at an automated announcement unit;
   identifying a set of menu options based on a plurality of factors, wherein at least one of the plurality of factors includes a geographic region of the caller;
   determining an order of the set of menu options to generate an ordered set of menu options based on weightings associated with each factor of the plurality of factors, wherein the weightings are not defined by the caller, each of the weightings is applied to each of the plurality of factors to produce each weighted factor;
   generating an announcement with respect to the call at the automated announcement unit by playing an ordered sequence of audio clips, wherein the ordered sequence of audio clips is based on the ordered set of menu options, and wherein one or more audio clips of the ordered sequence of audio clips are associated with one or more products or services that are available to the caller based on the geographic region of the caller; and
   receiving a caller selection of a menu option of the set of menu options; wherein the automated announcement unit configured to play a pre-emptive clip before playing the ordered sequence of audio clips when an exception condition exists.

12. The method of claim 11, further comprising performing a call handling action in response to the caller selection.

13. The method of claim 11, wherein the plurality of factors further include a frequency of option selection, a caller characteristic, a time based change in frequency, a marketing priority, and an exception condition.

14. The method of claim 11, wherein at least one of the plurality of factors includes a frequency of option selection.

15. The method of claim 11, wherein a first weighting is applied to a first factor to produce a first weighted factor and a second weighting is applied to a second factor to produce a second weighted factor and wherein the order of the ordered set of menu options is determined based on comparing the first weighted factor to the second weighted factor.

16. The method of claim 11, wherein the exception condition includes a service outage of a network, and wherein the pre-emptive clip provides the caller with information about the service outage.

17. The method of claim 16, wherein the pre-emptive clip provides a selectable option associated with the service outage that is played before playing the ordered sequence of audio clips.

18. The method of claim 11, wherein the exception condition includes an emergency, and wherein the pre-emptive clip includes an emergency announcement.

19. The method of claim 16, wherein the service outage includes an outage of a digital subscriber line (DSL) network.

20. An announcement system comprising:
a call reception module configured to receive a call from a caller;
a memory including an ordered sequence of audio clips, the ordered sequence of audio clips including at least a first general clip and an ordered set of menu option voice prompts, wherein the ordered set of menu option voice prompts is ordered based on a plurality of weighted factors, wherein the plurality of weighted factors is not defined by the caller, wherein at least one of the plurality of weighted factors includes a geographic region of the caller, and wherein one or more audio clips of the ordered sequence of audio clips are associated with one or more products or services that are available to the caller based on the geographic region of the caller, each of a plurality of weightings is applied to each of a plurality of factors to produce each weighted factor;
an announcement engine configured to play an audio announcement derived from the ordered sequence of audio clips; and
a response system configured to receive a caller selection associated with one of the ordered set of menu option voice prompts, wherein the response system is further configured to receive the caller selection concurrently with the announcement engine playing the audio announcement derived from the ordered sequence of audio clips, and wherein the caller selection includes one of a caller statement and a numeric selection; wherein the announcement engine configured to play a pre-emptive clip before playing the ordered sequence of audio clips when an exception condition exists.

21. The announcement system of claim 20, wherein the plurality of weighted factors further includes a frequency of option selection, a caller characteristic, a time based change in frequency, a marketing priority, and an exception condition.

22. The announcement system of claim 20, wherein the ordered sequence of audio clips further includes a second general clip, and wherein the first general clip and the second general clip are ordered based on a set of factors associated with general clips.

23. The announcement system of claim 22, wherein the first general clip and the second general clip are ordered to accommodate regional variations in language preferences.

24. An interactive call handling system comprising:
a call reception module configured to receive an incoming call from a caller;
a factor engine responsive to the call reception module and configured to identify a set of menu options based on a plurality of factors, wherein the factor engine is further configured to order the set of menu options based on weightings associated with each factor of the plurality of factors, wherein the weightings are not defined by the caller, and wherein at least one of the plurality of factors includes a geographic region of the caller, each of the weightings is applied to each of the plurality of factors to produce each weighted factor;
an audio clip sequencing engine responsive to the factor engine and configured to generate an ordered sequence of audio clips corresponding the ordered set of menu options, wherein one or more audio clips of the ordered sequence of audio clips are associated with one or more products or services that are available to the caller based on the geographic region of the caller;
an announcement engine responsive to the audio clip sequencing engine and responsive to the call reception module, the announcement engine configured to play the ordered sequence of audio clips in response to the incoming call;
a response system responsive to the call reception module and configured to receive a caller selection of a menu option of the set of menu options, wherein the response system is further configured to receive the caller selection concurrently with the announcement engine playing the ordered sequence of audio clips; and
a call handling action system responsive to the response system and configured to perform a call handling action in response to the caller selection; wherein the announcement engine configured to play a pre-emptive clip before playing the ordered sequence of audio clips when an exception condition exists.

25. The interactive call handling system of claim 24, wherein the response system includes an interactive voice response (IVR) system, wherein the caller selection includes a caller statement corresponding to the selected menu option, and wherein the call handling action is associated with the caller statement.

26. The interactive call handling system of claim 24, wherein the caller selection includes a Dual Tone Multi Frequency (DTMF) selection corresponding to the selected menu option, and wherein the call handling action is associated with the DTMF selection.

* * * * *